(12) United States Patent
Kursar

(10) Patent No.: US 9,978,071 B2
(45) Date of Patent: May 22, 2018

(54) CUSTOMER RELATIONSHIP MANAGEMENT SYSTEM

(71) Applicant: Toyota Motor Sales, U.S.A., Inc., Torrance, CA (US)

(72) Inventor: Brian M. Kursar, Rolling Hills Estates, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 0 days. days.

(21) Appl. No.: 15/441,121

(22) Filed: Feb. 23, 2017

(65) Prior Publication Data

US 2017/0161751 A1 Jun. 8, 2017

Related U.S. Application Data

(63) Continuation of application No. 14/633,311, filed on Feb. 27, 2015.

(51) Int. Cl.
| | |
|---|---|
| *G06Q 30/00* | (2012.01) |
| *G06Q 30/02* | (2012.01) |
| *G06Q 30/06* | (2012.01) |
| *H04L 29/08* | (2006.01) |
| *H04W 4/02* | (2018.01) |
| *G06Q 50/00* | (2012.01) |

(52) U.S. Cl.
CPC ......... *G06Q 30/01* (2013.01); *G06Q 30/0255* (2013.01); *G06Q 30/0261* (2013.01); *G06Q 30/0269* (2013.01); *G06Q 30/0613* (2013.01); *G06Q 30/0639* (2013.01); *H04L 67/306* (2013.01); *H04W 4/02* (2013.01); *G06Q 50/01* (2013.01)

(58) Field of Classification Search
CPC .................................................. G06Q 30/0261
USPC .......................................................... 705/14
See application file for complete search history.

(56) References Cited

U.S. PATENT DOCUMENTS

| | | | |
|---|---|---|---|
| 8,447,510 B2 | 5/2013 | Fitzpatrick et al. | |
| 9,165,319 B1* | 10/2015 | Henry | G06Q 30/0623 |
| 9,467,805 B2* | 10/2016 | Farris | H04W 4/02 |
| 9,686,646 B1* | 6/2017 | Pecard | H04W 4/021 |
| 2003/0088436 A1* | 5/2003 | Berger | G06Q 10/20 |
| | | | 705/304 |
| 2003/0182215 A1 | 9/2003 | Ringler | |
| 2004/0093268 A1* | 5/2004 | Ramchandani | G06Q 30/02 |
| | | | 705/14.13 |
| 2004/0129770 A1* | 7/2004 | Masuno | G06Q 30/00 |
| | | | 235/375 |

(Continued)

*Primary Examiner* — Matthew L Hamilton
(74) *Attorney, Agent, or Firm* — Christopher G. Darrow; Darrow Mustafa PC

(57) ABSTRACT

Systems and methods for customer relationship management are disclosed. In one example, a customer relationship management system can receive, from a customer device, a customer location and a request for a sales representative. In response, the customer relationship management system can send, for display to a sales representative device, the customer location and then receive, from the sales representative device, a request for customer profile information. In response to this request, the customer relationship management system can send, for display to the sales representative device, at least some of the customer profile information.

16 Claims, 7 Drawing Sheets

(56) References Cited

U.S. PATENT DOCUMENTS

| | | | |
|---|---|---|---|
| 2010/0073201 A1* | 3/2010 | Holcomb | G08G 1/005 340/990 |
| 2010/0121567 A1 | 5/2010 | Mendelson | |
| 2010/0124937 A1* | 5/2010 | Vogel | G06Q 30/02 455/466 |
| 2011/0184799 A1 | 7/2011 | Henderson | |
| 2012/0232995 A1* | 9/2012 | Castro | G06Q 10/02 705/14.64 |
| 2013/0080290 A1* | 3/2013 | Kamm | G06Q 30/0281 705/26.61 |
| 2013/0211916 A1* | 8/2013 | Putman | G06Q 40/02 705/14.58 |
| 2013/0297422 A1 | 11/2013 | Hunter et al. | |
| 2013/0325620 A1 | 12/2013 | Walker | |
| 2014/0025507 A1* | 1/2014 | Rogener | G06Q 30/0269 705/14.66 |
| 2014/0046802 A1* | 2/2014 | Hosein | G01R 1/06711 705/26.61 |
| 2014/0058841 A1 | 2/2014 | Getchius | |
| 2014/0279105 A1* | 9/2014 | Winokur | G06Q 30/0611 705/21 |
| 2014/0310124 A1* | 10/2014 | Schifferle | G06Q 30/0621 705/26.5 |
| 2014/0350980 A1* | 11/2014 | Tolson | C07C 45/45 705/7.11 |
| 2015/0193726 A1* | 7/2015 | Simmons | G06Q 10/087 705/28 |
| 2015/0223012 A1* | 8/2015 | Kakarala | H04W 4/008 705/26.8 |
| 2015/0317713 A1* | 11/2015 | Henry | G06Q 30/0623 705/26.61 |
| 2015/0379618 A1* | 12/2015 | Neumann | G06Q 30/06 705/14.55 |
| 2016/0027055 A1* | 1/2016 | Dixon | G06Q 30/0261 705/14.58 |
| 2016/0071054 A1* | 3/2016 | Kakarala | G06Q 10/087 705/28 |
| 2016/0119539 A1* | 4/2016 | Tan | B60R 1/00 348/148 |
| 2016/0217506 A1* | 7/2016 | Kakarala | G06Q 30/0641 |
| 2016/0371759 A1* | 12/2016 | Wilson | G06Q 30/0623 |

* cited by examiner ated by the CPU 102
CUSTOMER RELATIONSHIP MANAGEMENT SYSTEM

CROSS-REFERENCE TO RELATED APPLICATION

This application is a continuation of pending U.S. application Ser. No. 14/633,311, filed Feb. 27, 2015, which is incorporated by reference in its entirety.

BACKGROUND

Some customer shopping experiences can be improved by the use of targeted advertising based on the preferences previously shown by a customer, for example, stored within a customer profile. Examples of targeted advertising exist in grocery store settings in the form of special offers or targeted coupons as well as in internet-based shopping settings where targeted offers can be made to a customer based, for example, on browsing history information.

However, a customer's in-person experience with a sales representative can be limited by a lack of familiarity on the part of the sales representative with the interests or preferences of the customer. In prior-art in-person situations, a sales representative would need to either speak at length with a customer to identify the customer's preferences or hover nearby the customer to note what types of products, such as vehicles in a dealership, were the subject of the customer's browsing interest.

SUMMARY

Methods of customer relationship management are disclosed. Some of these methods include receiving a customer location, for example, within a vehicle dealership, from a customer device and providing an indication of this location to a sales representative device. In addition to providing the physical location of the customer, the methods can include providing customer profile information to the sales representative device to familiarize the sales representative with the customer's interests prior to interaction with the customer. Customer profile information can include vehicle interest information, such as how often the customer has searched for a vehicle on a vehicle website, as well as dealership specific customer information, such as a vehicle service history associated with the customer.

In one implementation, a customer relationship management method is disclosed. The method includes receiving, from a customer device, a customer location proximate to a vehicle; receiving, from the customer device, vehicle interest information based on the customer location proximate to the vehicle; and updating customer profile information based on the vehicle interest information.

In another implementation, another customer relationship management method is disclosed. The method includes receiving, from a customer device, a customer location; receiving, from the customer device, a request for a sales representative; sending, for display to a sales representative device, the customer location; receiving, from the sales representative device, a request for customer profile information; and sending, for display to the sales representative device, the customer profile information.

In another implementation, a computing device is disclosed. The computing device includes one or more processors for controlling operations of the computing device and a memory for storing data and program instructions used by the one or more processors. The one or more processors are configured to execute instructions stored in the memory to: receive, from a customer device, a customer location proximate to a vehicle; receive, from the customer device, vehicle interest information based on the customer location proximate to the vehicle; update customer profile information based on the vehicle interest information; and send, for display to a sales representative device, an indication of the customer location and at least some of the customer profile information.

BRIEF DESCRIPTION OF THE DRAWINGS

The description herein makes reference to the accompanying drawings wherein like reference numerals refer to like parts throughout the several views, and wherein.

DETAILED DESCRIPTION

The customer relationship management system described here is configured to update a customer's profile based on vehicle interest information and provide customer profile information to a sales representative prior to in-person interaction between the customer and the sales representative. Vehicle interest information can include browse duration, that is, how long the customer spends looking at a specific vehicle given the customer's physical location proximate to the vehicle as provided to the customer relationship management system based on emissions from a low-energy beacon. The customer relationship management system can also help customers and sales representatives interact by providing directions to vehicles of interest to both the customer and the sales representative within a dealership as well as information related to dealership services and dealership promotions.

Figure 1:
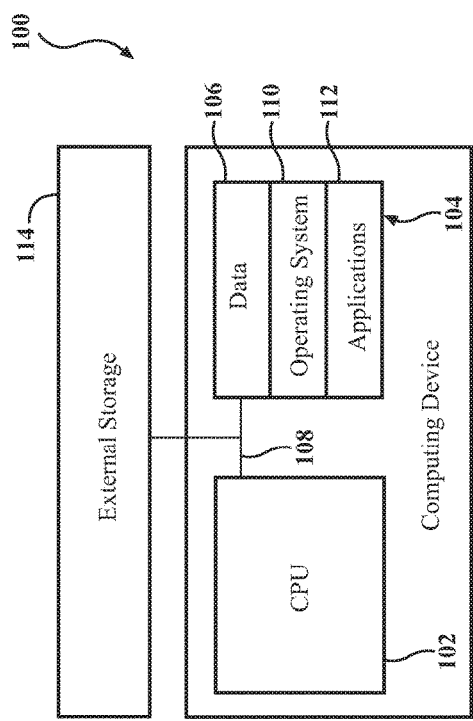
FIG. 1 is a block diagram of a computing device implementing a customer relationship management system.

FIG. 1 is a block diagram of a computing device 100 implementing a customer relationship management system. The computing device 100 can be any type of handheld, desktop, or other form of single computing device, or can be composed of multiple computing devices. For example, the computing device 100 can be a cloud computing service, or the cloud. The cloud can include hundreds or thousands of servers configured to provide scalable computing resources. The computing device 100 can include a conventional central processing unit (CPU 102) or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the customer relationship management methods described below. The computing device 100 can also include additional or secondary storage 114, for example, a memory card, flash drive, or any other form of computer readable medium. The installed applications 112 can be stored in whole or in part in the secondary storage 114 and loaded into the memory 104 as needed for processing.

Figure 2:
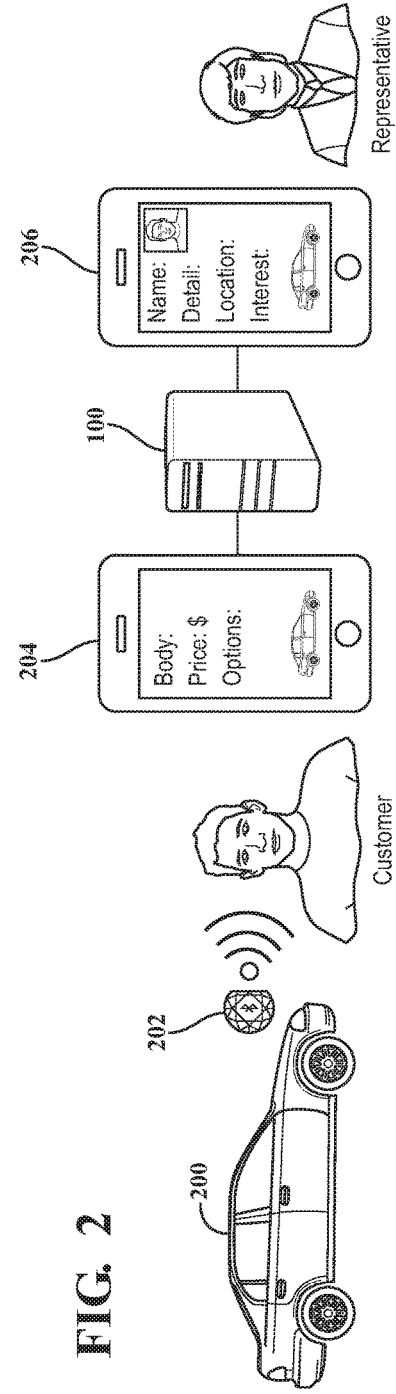
FIG. 2 shows an exemplary customer and sales representative communication interface to the customer relationship management system of FIG. 1.

FIG. 2 shows an exemplary customer and sales representative communication interface to the customer relationship management system of FIG. 1. As part of the communication interface, a vehicle 200 located, for example, on a sales floor at a dealership, can include or be proximate to a low-energy Bluetooth™ device, or beacon device 202, broadcasting information in a set interval. The information broadcast by the beacon device 202 can include information that identifies the vehicle 200, such as a vehicle identification number as well as information that identifies the physical location of the beacon device 202, for example, in respect to other beacon devices within the dealership.

The information broadcast by the beacon device 202 can be received, for example, by a customer device 204, such as a smartphone, tablet, PDA, laptop, etc. when the customer device 204 is sufficiently proximate to the beacon device 202. In one example, the proximity required for information transfer between the beacon device 202 and the customer device 204 is several meters, though the range can be designed to be smaller or larger. The customer device 204 can be configured, through the use of a specific application, or "app," to recognize the information broadcast by the beacon device 202, and in turn, send information to and/or request information from the computing device 100 of FIG. 1. The customer device 204 can also be configured to display information to the customer based on the information received from the beacon device 202.

In the example of FIG. 2, the customer device 204 receives information from the beacon device 202, and in turn, displays information about the vehicle 200, such as the body style, price, and set of options, to the customer on the customer device 204. To achieve this, the customer device 204 passes the information from the beacon device 202 to the computing device 100. The computing device 100, implementing the customer relationship management system, can then retrieve detailed information about the vehicle 200 based on the information from the beacon device 202 and display it to the customer.

In addition to sending information broadcast from the beacon device 202 to the computing device 100, the customer device 204 can send information specific to the customer, such as information stored in a customer profile created by the customer, from the customer device 204 to the computing device 100. Information stored in the customer profile can include customer demographics, such as the customer's name, age, family status, etc., as well as the customer's vehicle interests. In terms of vehicle interests, the customer's profile can be updated using the information broadcast from the beacon device 202, that is, the customer's profile can include vehicle interest information in the form of browse duration information indicating how long the customer was proximate to the vehicle 200 with the associated beacon device 202.

After the customer's profile is updated, the computing device 100 can be configured to send customer profile information, including both customer demographics and vehicle interest information, to a sales representative device 206. The sales representative device 206 can then display the information from the customer's profile, such as the customer's name and a picture of the customer, in conjunction with information about the vehicle 200 proximate to the customer, the proximity being based on the timing of receipt of information from the beacon device 202. For example, the sales representative device 206 can show a name and picture for a customer as well as a picture of the vehicle 200 and whether the customer is currently proximate to the vehicle 200 or has browsed similar vehicles in the past, either in person at a dealership or online at a vehicle manufacturer website associated with the customer's profile. Armed with this introductory information, the sales representative can approach the customer with a basic understanding of the customer's interests.

In another embodiment, the sales representative device 206 can receive beacon information directly from the customer device 204. In this example, the beacon device 202 can be located proximate to the vehicle 200 or, for example, near a customer entrance to the dealership. The customer device 204 can receive information from the beacon device 202 and re-broadcast this information along with at information specific to the customer's profile directly to the sales representative device 206. The sales representative device 206 can then contact the computing device 100 to receive information from the customer's profile based on the information received from the customer device 204.

Figure 3A:
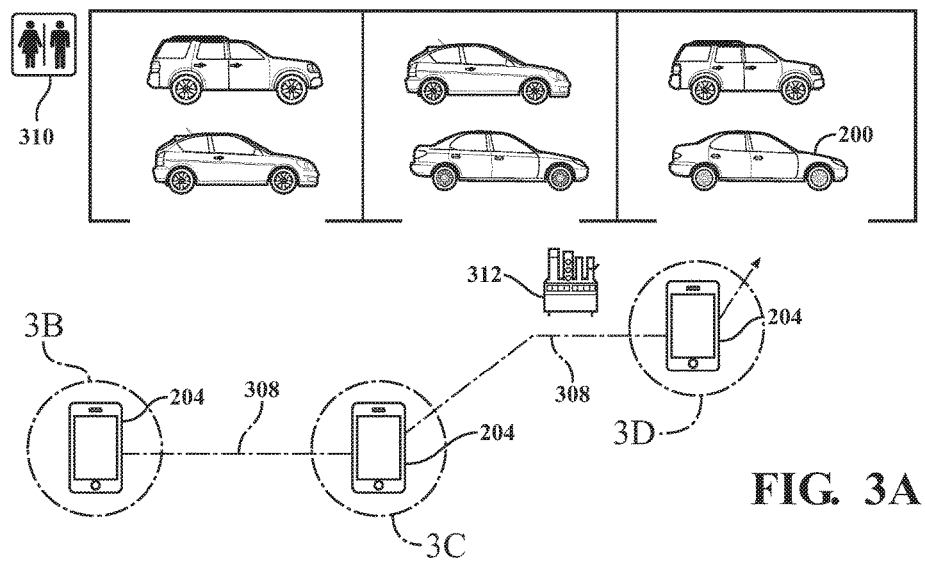
FIGS. 3A-3D show an exemplary customer interface to the customer relationship management system of FIG. 1 while the customer visits a vehicle dealership.
Figure 3B:
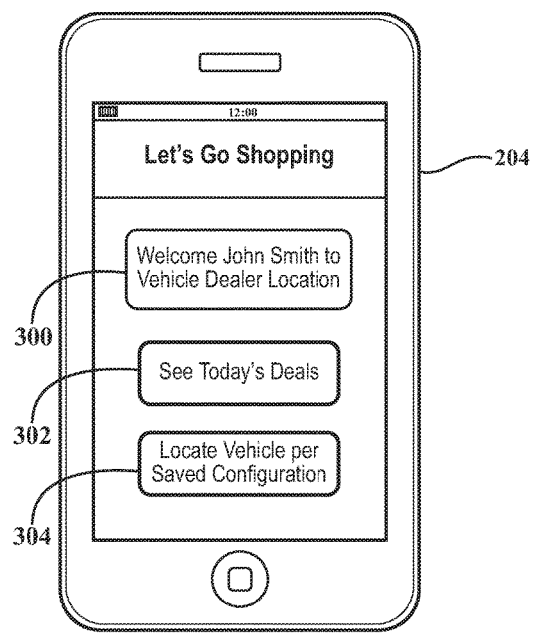
Figure 3D:
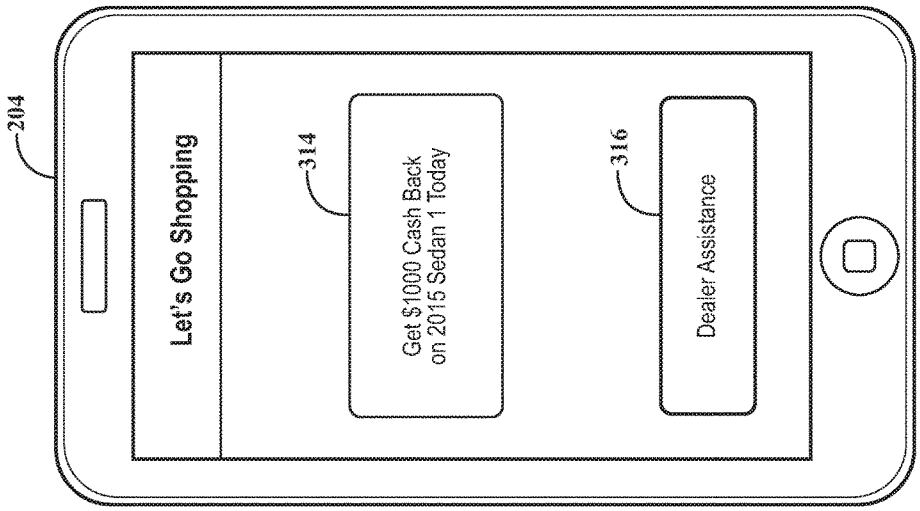
Figure 3C:
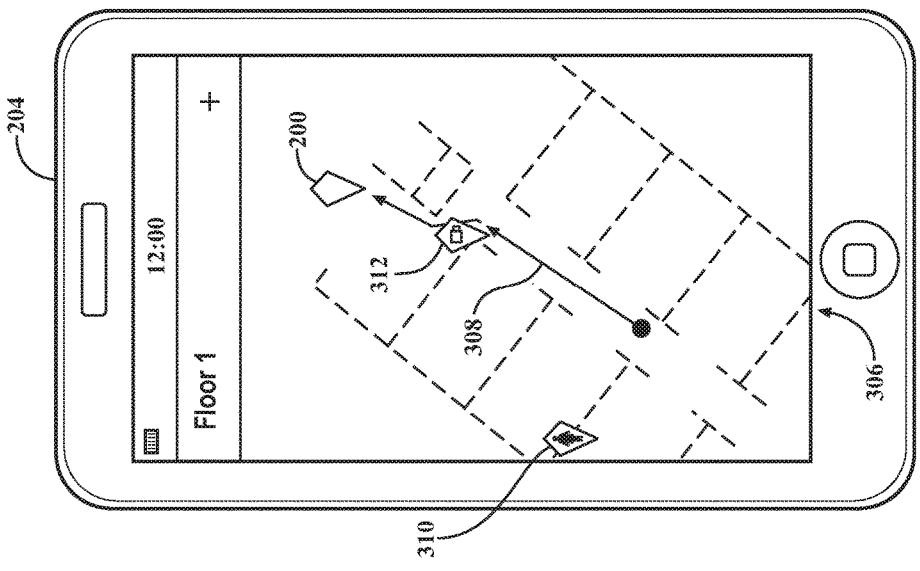

FIGS. 3A-3D show an exemplary customer interface to the customer relationship management system of FIG. 1 while the customer visits a vehicle dealership. Specifically, FIG. 3A shows a floorplan of the vehicle dealership and FIGS. 3B-3D show information displayed to the customer on the customer device 204 at various locations within the vehicle dealership.

In the display of FIG. 3B, the customer "John Smith" has just entered the vehicle dealership holding the customer device 204 of FIG. 2. The customer relationship management system is configured to receive, from the customer device 204, an indication of the customer's presence at the dealership. Presence or location can be based, for example, on a GPS location provided by the customer device 204, on a low-energy beacon signal emitted by the customer device 204, or on information emitted by a beacon device near the entrance of the vehicle dealership and received by the customer device 204. In response to this indication, the customer relationship management system can send, for display on the customer device 204, dealership information based on a stored customer profile.

The dealership information first displayed to the customer upon arrival at the dealership as shown in FIG. 3B can include a personalized welcome message 300, a dealership promotion link 302, and a vehicle location link 304, that is, a means for the customer to determine the location of a vehicle matching vehicle specifications of interest to the customer based on the customer's profile or previous browsing habits at either the dealership where the customer is located now or at other dealerships previously visited. If the customer were to select the dealership promotion link 302, information could be displayed to the customer about rebates offered on select vehicles or other discounts available to the customer from the dealership based on the customer's profile.

If the customer selects the vehicle location link 304, a map 306 can be displayed to the customer on the customer device 204 as shown in FIG. 3C. The map 306 highlights a path 308 for the customer to follow to find the vehicle 200 at the dealership matching the vehicle specifications of interest to the customer, in this case, a 2015 model year sedan. The same path 308 to be travelled by the customer is shown on the representation of the floorplan of the dealership in FIG. 3A. The map 306 of the dealership can include indications for dealership service information, such as dealership service locations. Example dealership service locations displayed on the map 306 of FIG. 3C include restrooms 310 and a refreshment cart 312. The restrooms 310 and the refreshment cart 312 are also shown on the floorplan of FIG. 3A in reference to the path 308 between the customer and the vehicle 200.

Optionally, the dealership information displayed to the customer can include a refreshment request link (not shown) allowing the customer to request a cup of coffee or bottle of water from the refreshment cart 312 in advance of approaching the refreshment cart 312. Other dealership service locations that can be shown to the customer on the map 306 include a waiting room, a parts department, a billing department, etc. After the customer follows the path 308 through the dealership past the refreshment cart 312, the customer device 204 can be configured to display additional dealership information to the customer based on the customer profile and the vehicle 200 being approached.

For example, and as shown in FIG. 3D, a rebate message 314 can be displayed to the customer related to the vehicle 200 in combination with a sales representative request link 316. The customer can thus be made aware of monetary incentives available for the vehicle 200 while at the same time receiving means, in the form of the sales representative request link 316, to request the assistance of a sales representative with any questions about the vehicle 200 as further described below.

Figure 4A:
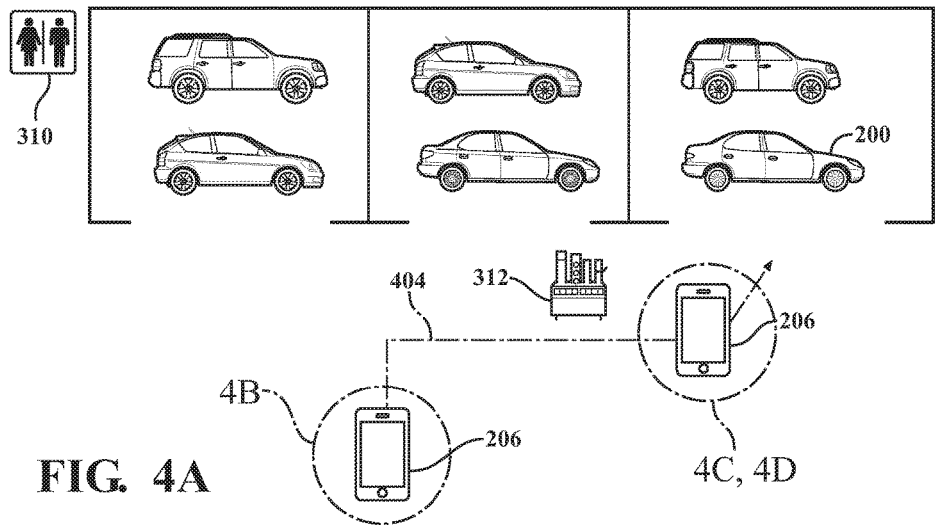
FIGS. 4A-4D show an exemplary sales representative interface to the customer relationship management system of FIG. 1 at the vehicle dealership of FIG. 3.
Figure 4B:
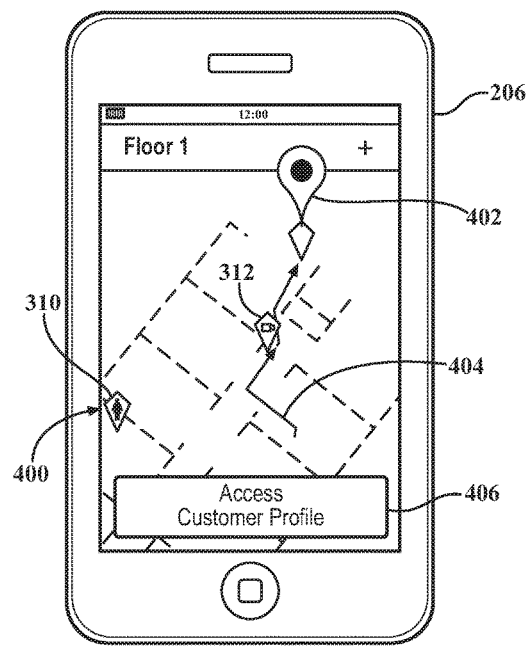
Figure 4C:
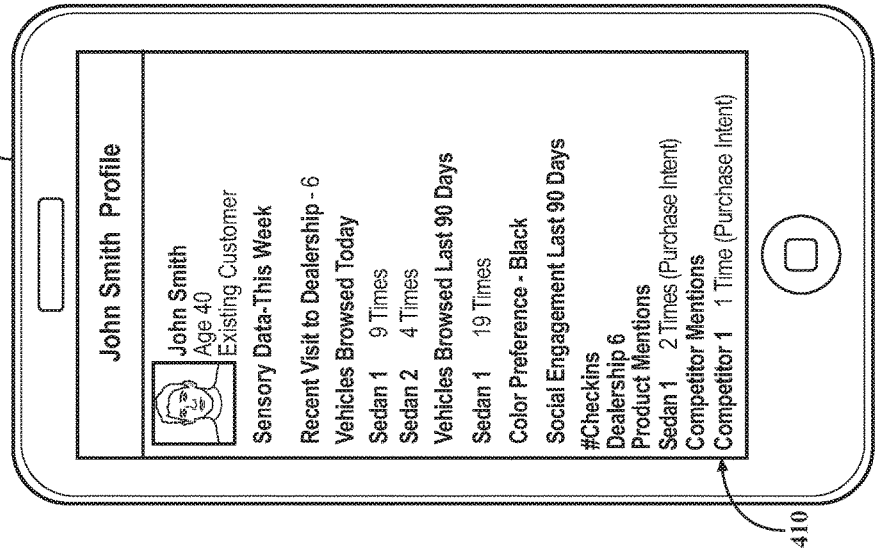
Figure 4D:
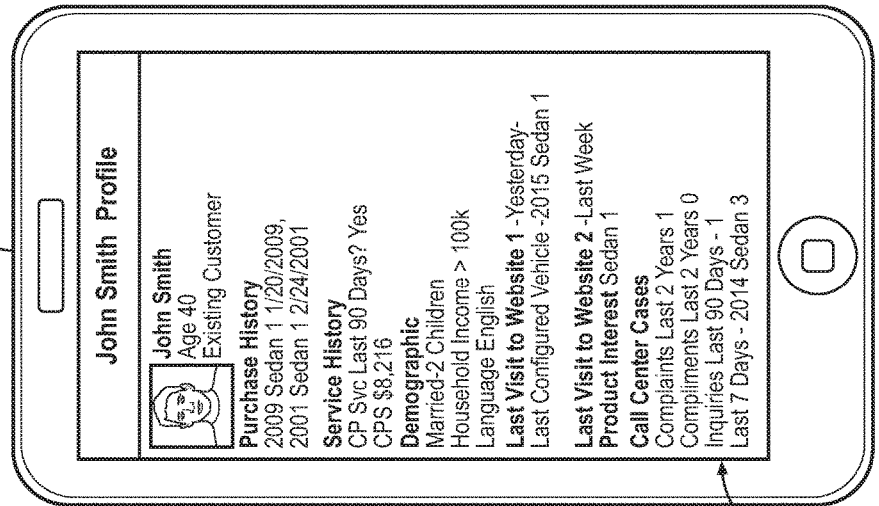

FIGS. 4A-4D show an exemplary sales representative interface to the customer relationship management system of FIG. 1 at the vehicle dealership of FIG. 3. Specifically, FIG. 4A shows a floorplan of the vehicle dealership and FIGS. 4B-4D show information displayed to the sales representative on the sales representative device 206 at various locations within the vehicle dealership.

When the customer selects the sales representative request link 316, the customer relationship management system can send a map 400 for display to the sales representative device 206 as shown in FIG. 4B. The map 400 includes a representation of a customer location 402 and a directional path 404 between the current location of the sales representative device 206 and the customer device 204, in this case, proximate to the vehicle 200. The various dealership service locations, such as the restrooms 310 and the refreshment cart 312, are also shown on the map 400 displayed to the sales representative for use in identifying the customer location 402 more easily by context.

In addition to the map 400, the customer relationship management system can be configured to send a customer profile link 406 to the sales representative device 206 in response to receiving the indication of the request for the sales representative from the customer device 204. The sales representative can then select the customer profile link 406 if the sales representative wishes to see, for example, customer profile information such as customer demographics, vehicle service history for the customer, customer service history, or vehicle interest information as associated with the customer's profile. The customer relationship management system can also be configured to send the map 400 and/or the customer profile link 406 to the sales representative device 206 upon receiving an indication from the customer device 204 that the customer is present at the dealership.

FIG. 4C shows a first page 408 of customer profile information available to the sales representative after selecting the customer profile link 406. The first page 408 can be displayed to the sales representative on the sales representative device 206 while the sales representative follows the path 404 between his desk and the location of the customer near the vehicle 200. The first page 408 includes customer demographics such as the customer's name, "John Smith," the customer's age, "40," and the customer's family status, "Married—2 Children." The first page 408 also includes a purchase history for the customer as tied to the customer's profile, specifically, that the customer has previously purchased a "Sedan 1" type of vehicle both in 2001 and in 2009.

The first page 408 of customer profile information shown in FIG. 4C also includes a vehicle service history associated with the customer's profile, specifically, that the customer received service from the dealership within the last 90 days and spent over eight thousand dollars on the service, likely a major repair. The first page 408 also includes a customer service history in the form of call center instances, that is, how many calls the customer has placed to a help desk or customer service representative related to an existing vehicle or a customer service experience with the dealership. The first page 408 also includes vehicle interest information in the form of visits to vehicle-related websites either associated with the dealership or associated with the brand of vehicles sold by the dealership, specifically, "Website 1" and "Website 2."

FIG. 4D shows a second page 410 of customer profile information that can also be displayed to the sales representative on the sales representative device 206. Though explained using the nomenclature of separate pages, the first page 408 and the second page 410 can be a single page or any other format of information display which can be navigated in a manner dependent on the format of the sales representative device 206. The second page 410 includes additional vehicle interest information in the form of recent visits made by the customer to the dealership and the number of times the customer browsed specific vehicles, for example, was proximate to the vehicle 200 as indicated by the associated beacon device 202.

In the example shown in FIGS. 4C and 4D, the customer "John Smith" has browsed the "Sedan 1" style of vehicle over 19 times in the past 90 days, either in person at the "Dealership" or online at "Website 1" or "Website 2." Given the number of times that the customer has looked at "Sedan 1," the sales representative can be armed with the information that "John Smith" is probably very interested in a near term purchase of a "Sedan 1" style of vehicle and focus his discussion with "John Smith" on that model.

The second page 410 of customer profile information can also include vehicle interest information in the form of social engagements, for example, the number of times that the customer has mentioned "Sedan 1" in social media contexts, has "Checked-in" at the dealership, or has mentioned any other types of vehicle, such as "Competitor 1." The customer's social engagements can give the sales representative an even clearer picture of the customer's interest in a specific vehicle such as "Sedan 1." Referring back to FIG. 4A, the sales representative can approach the customer near the vehicle 200 by following the path 404, greet the customer by name, "John Smith," and immediately begin speaking with the customer about the latest developments or offerings associated with the "Sedan 1" style of vehicle.

Optionally, for example, if the customer requested a drink from the refreshment cart 312 shown on the dealership floorplans of FIGS. 3A and 4A and on the maps 306 and 400 of FIGS. 3C and 4B, the sales representative can be notified to pick up the refreshment for the customer and to meet the customer at the refreshment cart 312 on the way to the vehicle 200. The integration of customer location information, vehicle interest information, and dealership services provided by the customer relationship management system can thus provide an improved customer experience at the vehicle dealership.

Figure 5:
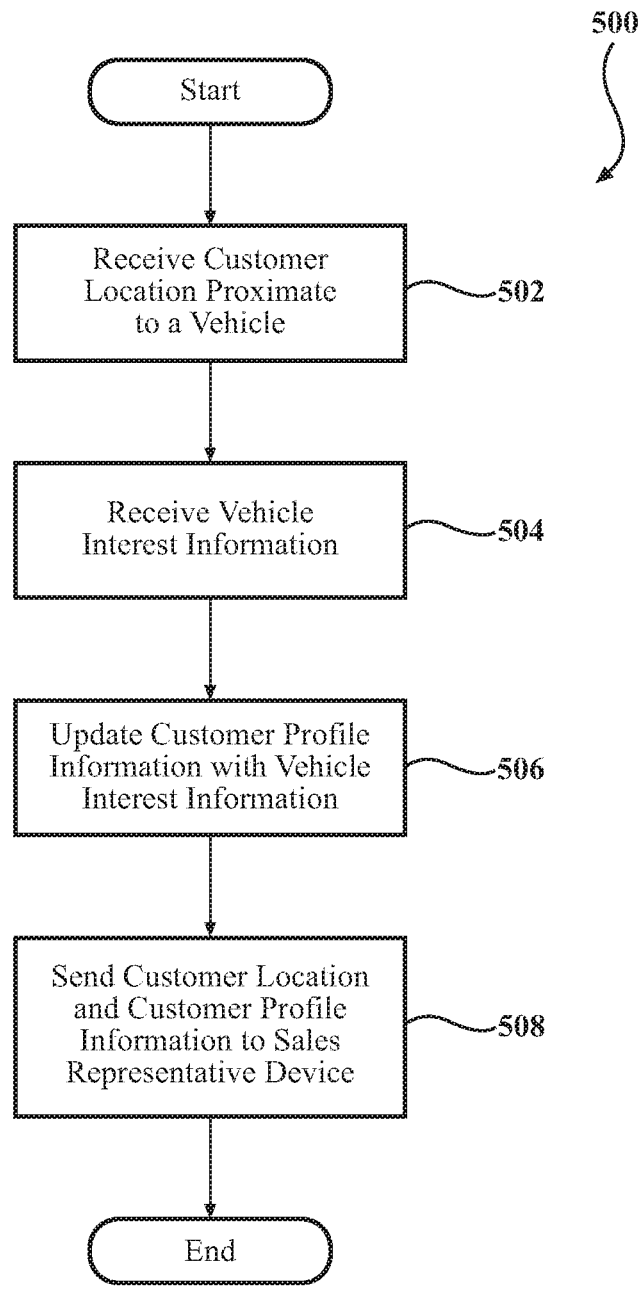
FIG. 5 is a flowchart of an exemplary customer relationship management process implemented by the computing device of FIG. 1.

FIG. 5 is a flowchart of an exemplary customer relationship management process 500 implemented by the computing device of FIG. 1. In step 502, the customer relationship management system can receive a customer location proximate to a vehicle from a customer device. For example, the vehicle 200 can include or be associated with the beacon device 202 emitting information specific to the vehicle 200 and the customer device 204 can receive and forward this information to the computing device 100.

In step 504, the customer relationship management system can receive vehicle interest information based at least in part, for example, on the customer location proximate to the vehicle 200 as provided by the customer device 204. This vehicle interest information can include a browse duration, that is, how long the customer has been proximate to vehicle 200. The vehicle interest information can also include information related to the customer's website visitations, social engagements, and test drives of vehicles such as vehicle 200.

In step 506, the customer relationship management system can update a customer profile based on the vehicle interest information received. Customer profile information can also include customer demographics, such as the name, age, marital status, and picture of the customer, a vehicle service history associated with the customer, and a customer service history associated with the customer.

In step 508, the customer relationship management system can send an indication of the customer location, for example, proximate to the vehicle 200, and at least some customer profile information to a sales representative device, such as the sales representative device 206. This indication can be sent to the sales representative, for example, in response to the customer selecting the sales representative request link 316 of FIG. 3D. After step 508, the process 500 ends.

Figure 6:
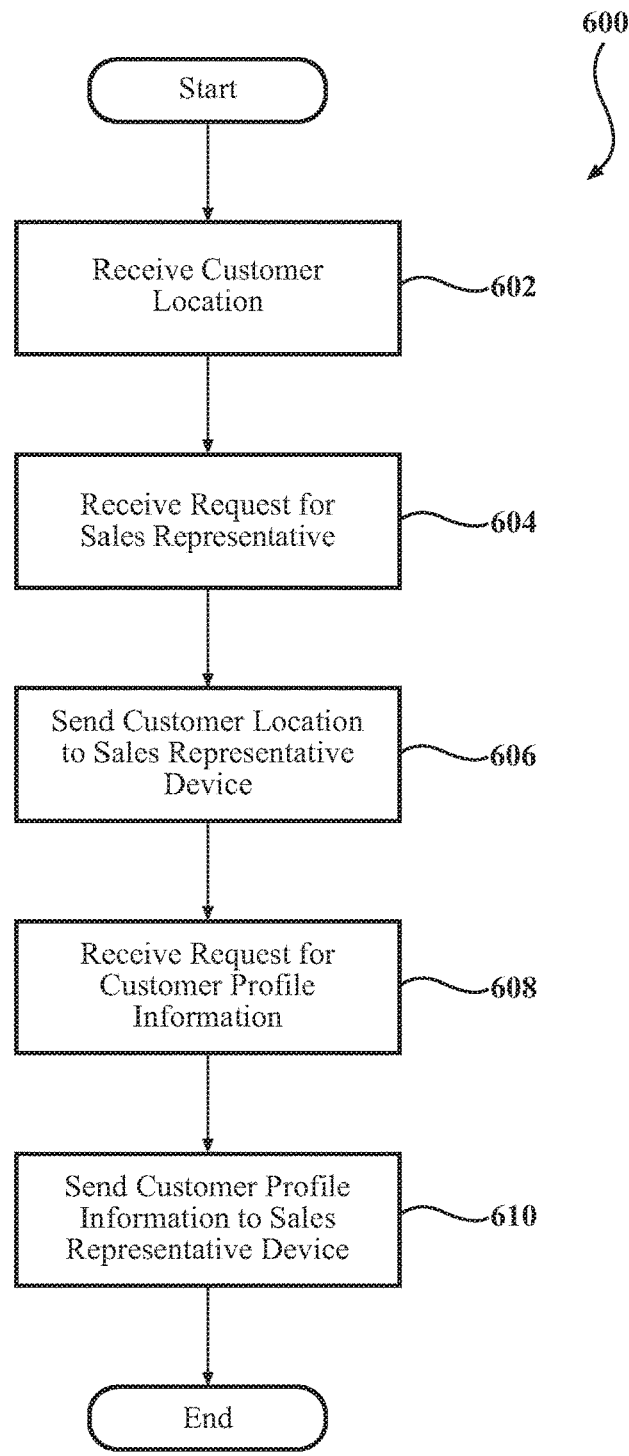
FIG. 6 is a flowchart of another exemplary customer relationship management process implemented by the computing device of FIG. 1.

FIG. 6 is a flowchart of another exemplary customer relationship management process 600 implemented by the computing device of FIG. 1. In step 602, the customer relationship management system can receive a customer location from a customer device, such as the customer device 204. The customer location can be based, for example, on information emitted by a beacon associated with a vehicle proximate to the customer device 204 or based on GPS information provided by the customer device 204.

In step 604, the customer relationship management system can receive a request for a sales representative, based, for example, on the use of the sales representative request link 316 displayed by the customer device 204 as shown in FIG. 3D. The sales representative request link 316 can be displayed on the customer device 204 as part of dealership information tailored to the customer based on the customer's profile. Other types of dealership information can include vehicle specifications, such as descriptions of the options available on vehicles at the dealership, dealership promotion information, such as rebates and discounts, and dealership service information, such as refreshment request links or dealership service locations. Alternatively, the request for the sales representative can be generated automatically by the customer device 204, once the customer device 204 receives information emitted by a beacon located, for example, proximate to the customer's location at the entrance of the dealership or proximate to a vehicle at the dealership.

In step 606, the customer relationship management system can send an indication of the customer location to the sales representative device 206. For example, FIG. 4B shows the customer location 402 on the map 400 as displayed on the sales representative device 206 in response to the use of the sales representative request link 316 by the customer.

In step 608, the customer relationship management system can receive, for example, from the sales representative device 206, a request for customer profile information. FIG. 4B shows the customer profile link 406 and the customer location 402 on the map 400 displayed by the sales representative device 206. The use of the customer profile link 406 by the sales representative can generate the request for the customer profile information.

In step 610, the customer relationship management system can send, for example, for display on the sales representative device 206, relevant customer profile information so that the sales representative may become familiar with the interests of the customer before engaging the customer. Examples of the types of customer profile information that can be displayed to the sales representative are shown in FIGS. 4C and 4D. Such customer profile information includes customer demographics, vehicle service history, customer service history, and vehicle interest information, such as website visitations, browse durations, social engagements related to the dealership, and vehicle test drives. After step 610, the process 600 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A customer relationship management method, comprising:
   providing a vehicle at a dealership, the vehicle associated with a beacon device to broadcast information, in a set interval, to identify the vehicle and provide a physical location of the vehicle at the dealership;
   receiving, by an interface application on a customer device, information broadcast from the beacon device;
   sending, by the interface application, the broadcast information and any vehicle interest information associated with a customer from the customer device to a customer relationship management computing device;
   updating, by the customer relationship management computing device, customer profile information in the customer relationship management computing device based on the any vehicle interest information;
   receiving, by the customer relationship management computing device, an indication of a request for a sales representative from the customer device;
   sending, by the customer relationship management computing device for display to a sales representative device in response to receiving the request for a sales representative, data from the customer profile in conjunction with information about the vehicle proximate to the customer, wherein the proximity is based on a timing of receipt of the information broadcast from the beacon device, and wherein the information broadcast from the beacon device includes a number of times the customer was proximate to the vehicle as indicated by the beacon device; and sending, by the customer relationship management computing device for display to the sales representative device in response to receiving the request for a sales representative, an indication of the customer location shown on a floorplan map of the dealership.

2. The method of claim 1, wherein the any vehicle interest information includes information related to at least one of a customer's: website visitations, duration of time spent at a location proximate to the vehicle, social engagements related to the dealership, and vehicle test drives.

3. The method of claim 1, further comprising:
sending, by the customer relationship management computing device for display to the customer device, dealership information based on the customer profile information.

4. The method of claim 3, wherein the dealership information includes at least one of vehicle specifications, a sales representative request link, dealership promotion information, and dealership service information.

5. The method of claim 4, wherein the dealership promotion information includes at least one of vehicle rebate information and dealership discount information.

6. The method of claim 4, wherein the dealership service information includes at least one of a refreshment request link and dealership service locations.

7. The method of claim 4, wherein the dealership information includes the sales representative request link, and wherein the receiving the indication of a request for a sales representative is based on use of the sales representative request link.

8. The method of claim 1, wherein the customer profile information includes at least one of: customer demographics, vehicle service history, and customer service history.

9. A system for managing customer relationships at a dealership, the system comprising:
a beacon device associated with a vehicle at the dealership, the beacon device broadcasting information, in a set interval, to identify and provide a physical location of the vehicle;
a customer device having an interface application configured to receive the broadcast information;
a sales representative device; and
a customer relationship management computing device configured to interface with both the customer device and the sales representative device, the customer relationship management computing device comprising:
one or more processors for controlling operations of the customer relationship management computing device; and
a memory for storing data and program instructions used by the one or more processors, wherein the one or more processors are configured to execute instructions stored in the memory to:
receive, by the customer relationship management computing device from the customer device, a customer location proximate to a vehicle;
receive, by the customer relationship management computing device from the customer device, vehicle interest information based on the customer location proximate to the vehicle;
update, by the customer relationship management computing device, customer profile information based on the vehicle interest information;
send, by the customer relationship management computing device for display to the sales representative device in response to receiving a request for a sales representative, data from the customer profile in conjunction with information about a vehicle proximate to the customer, wherein the proximity is based on a timing of receipt of information broadcast from the beacon device, and wherein the information broadcast from the beacon device includes a number of times the customer was proximate to the vehicle as indicated by the beacon device; and
send, by the customer relationship management computing device for display to the sales representative device in response to receiving the request for a sales representative, an indication of the customer location shown on a floorplan map of the dealership.

10. The system according to claim 9, wherein the one or more processors are further configured to execute instructions stored in the memory to:
send, by the customer relationship management computing device for display to the customer device, a sales representative request link;
receive, by the customer relationship management computing device from the customer device, an indication of a request for a sales representative based on use of the sales representative request link; and
in response to receiving the indication of the request for the sales representative, send by the customer relationship management computing device for display to the sales representative device, the indication of the customer location shown on the floorplan map of the dealership.

11. The system according to claim 10, wherein the one or more processors are further configured to execute instructions stored in the memory to:
in response to receiving the indication of the request for the sales representative, further send, by the customer relationship management computing device for display to the sales representative device, a customer profile link that provides access to information including at least one of: customer demographics, vehicle service history, vehicle interest information, and customer service history.

12. The system according to claim 9, wherein the interface application of the customer device is configured to re-broadcast information emitted from the beacon device, along with information specific to the customer profile, directly to the sales representative device.

13. The system according to claim 9, wherein the interface application is configured to automatically request a sales representative once the customer device receives information emitted by the beacon device.

14. The system according to claim 9, wherein the interface application provides a vehicle location link, and in response to a customer selecting the vehicle location link, the one or more processors are further configured to execute instructions stored in the memory to:
determine a location of a vehicle matching vehicle specifications of interest to the customer based on the customer profile information or previous browsing habits; and send, by the customer relationship management computing device for display to the customer device, a map that highlights a path on a floorplan of the dealership for the customer to follow to find the vehicle matching vehicle specifications of interest to the customer.

15. The method according to claim 1, wherein the interface application is configured to automatically request a sales representative once the customer device receives information emitted by the beacon device.

16. The method according to claim 1, wherein the interface application provides a vehicle location link; and
  in response to a customer selecting the vehicle location link, determining a location of a vehicle matching vehicle specifications of interest to the customer based on the customer profile information or previous browsing habits; and
  sending, by the customer relationship management computing device for display to the customer device, a map that highlights a path on a floorplan of the dealership for the customer to follow to find the vehicle matching vehicle specifications of interest to the customer.

\* \* \* \* \*